United States Patent [19]

Bamford

[11] Patent Number: 5,201,378
[45] Date of Patent: Apr. 13, 1993

[54] SKID STEER VEHICLE

[75] Inventor: Joseph C. Bamford, Montreux, Switzerland

[73] Assignee: J. C. Bamford Excavators Limited, Rocester, United Kingdom

[21] Appl. No.: 657,828

[22] Filed: Feb. 19, 1991

[30] Foreign Application Priority Data

Feb. 21, 1990 [GB] United Kingdom ............... 9003852
Feb. 21, 1990 [GB] United Kingdom ............... 9003853
Feb. 21, 1990 [GB] United Kingdom ............... 9003854
Feb. 21, 1990 [GB] United Kingdom ............... 9003920

[51] Int. Cl.$^5$ ........................................ B62D 55/125
[52] U.S. Cl. ................... 180/6.48; 180/65.5; 180/231; 180/905; 180/906; 301/1; 301/110.5; 301/124.1
[58] Field of Search ............ 180/6.2, 6.32, 6.48, 180/65.5, 65.6, 233, 231, 308, 76, 41, 209, 49.5, 905, 906, 9.52; 280/43.11, 47, 231, 220, 704, 840; 301/1, 9 TV, 128, 105 B, 124 R, 124 H, 5 R, 6 D

[56] References Cited

U.S. PATENT DOCUMENTS

| | | | |
|---|---|---|---|
| 1,743,751 | 1/1930 | Baker | 180/65.6 |
| 3,347,333 | 10/1967 | Edwards | 180/65.6 |
| 3,771,615 | 11/1973 | Rieli | 180/6.48 |
| 3,808,813 | 5/1974 | Spinks | 60/486 |
| 3,866,700 | 2/1975 | Bauer | 180/6.48 |
| 4,043,416 | 8/1977 | Albright et al. | 180/6.48 |
| 4,166,512 | 9/1979 | Giletti | 180/9.64 |
| 4,171,027 | 10/1979 | Seit et al. | 180/9.54 |
| 4,266,625 | 5/1981 | Garner | 180/6.48 |
| 4,407,381 | 10/1983 | Oswald | 180/6.48 |

FOREIGN PATENT DOCUMENTS

| | | |
|---|---|---|
| 2070620 | 10/1971 | France . |
| 1409590 | 10/1975 | United Kingdom . |
| 1475789 | 6/1977 | United Kingdom . |

*Primary Examiner*—Mitchell J. Hill
*Attorney, Agent, or Firm*—Armstrong, Westerman, Hattori, McLeland & Naughton

[57] ABSTRACT

A skid steer vehicle comprising a body having a front end and a rear end and ground engageable propulsion wheels disposed on opposite sides of the body, each propulsion wheel being carried on an outer end of a stub axle which is housed, so as to be rotatable about an axis of rotation, in a stub axle housing member mounted on the body wherein each stub axle housing member is provided with a carrier member which is mountable on the body in a selected one of a plurality of any angular positions about a reference axis, the stub axle housing member being positioned relative to the carrier member so that said axis of rotation is disposed eccentrically relative to said reference axis.

17 Claims, 12 Drawing Sheets

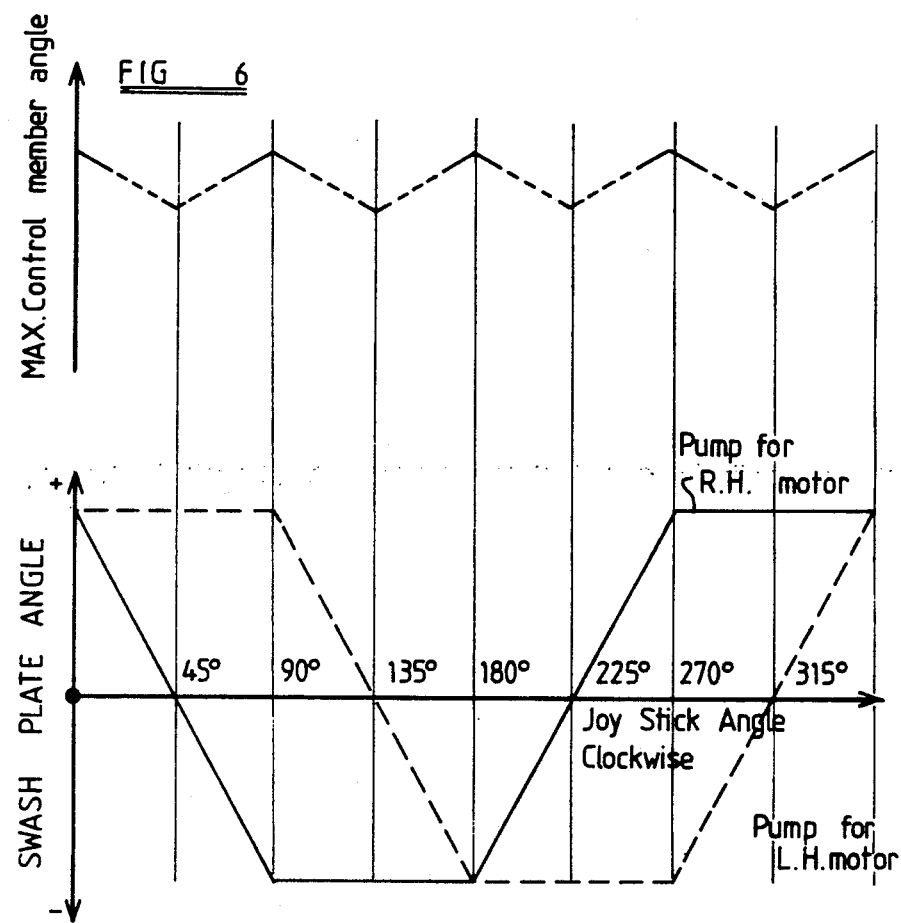
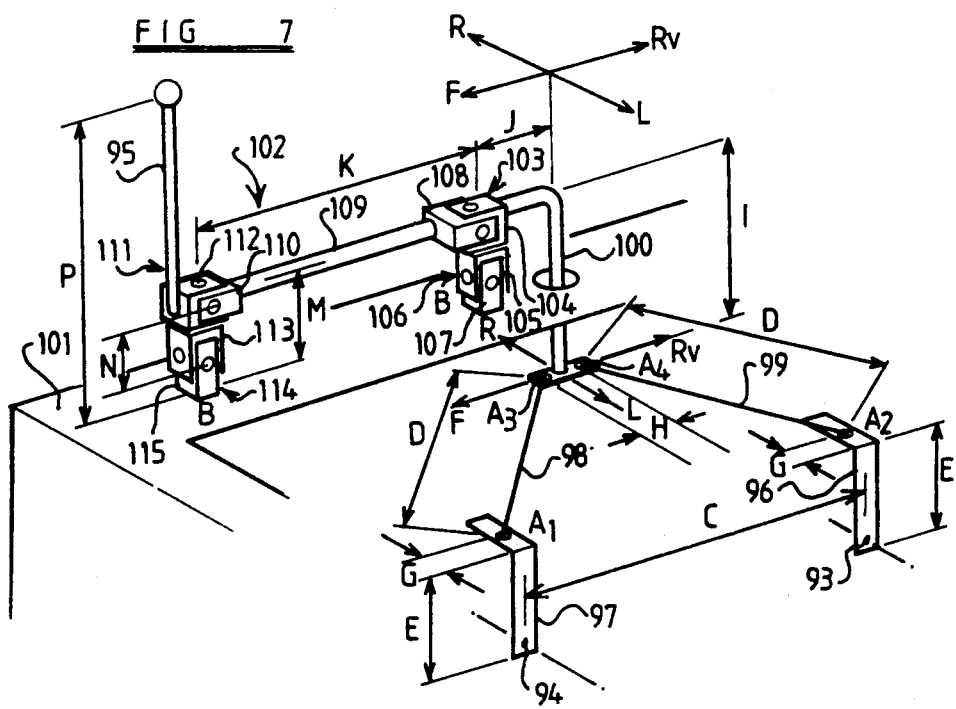

SKID STEER VEHICLE

CROSS-REFERENCE TO RELATED APPLICATIONS

The present application is related to three copending application of the present invention, filed on even date herewith, namely Ser. No. 7/657,569, entitled "SKID STEER VEHICLE" now abandoned; Ser. No. 7/657,678 "SKID STEER VEHICLE" now abandoned; and Ser. No. 7/657,648, entitled "LOADER VEHICLE", all of which are assigned to the assignee of the present invention.

BACKGROUND TO THE INVENTION

This invention relates to a skid steer vehicle, hereinafter referred to as "of the kind specified" comprising a body having a front end and a rear end and ground engageable propulsion wheels disposed on opposite sides of the body, each propulsion wheel being carried on an outer end of a stub axle which is housed, so as to be rotatable about an axis of rotation, in a stub axle housing member mounted on the body.

An inner end of each stub axle may have a driven wheel thereon which is driven by a flexible loop from a driving wheel driven by a motor or the inner end of each stub axle may be driven by other means such as a separate motor for each stub axle.

An object of the invention is to provide a new and improved skid steer vehicle of the kind specified.

SUMMARY OF THE INVENTION

According to one aspect of the present invention, we provide a skid steer vehicle of the kind specified wherein each stub axle housing member is provided with a carrier member which is mountable on the body in a selected one of a plurality of any angular positions about a reference axis, the stub axle housing member being positioned relative to the carrier member so that said axis of rotation is disposed eccentrically relative to said reference axis.

Preferably, the carrier member and the body are provided with cooperating guide means which guide the carrier member for rotation about said reference axis.

By virtue of said eccentric disposition of the axis of rotation, the distance between the driven wheel and the driving wheel may be adjusted thereby permitting adjustment of the wheel base, the ground clearance and the height of the centre of gravity of the machine; where the stub axles are driven by flexible loops, a flexible loop of appropriate length is provided. In addition, a flexible loop of a given length may be tensioned.

The body may be provided with an engine, two pairs of ground engageable propulsion wheels disposed on opposite sides of the body, a hydraulic drive means including first and second variable displacement pumps driven by the engine and operatively connected to first and second hydraulic motors disposed on opposite sides of the body, each pump being drivably connected to two ground engageable propulsion wheels of an associated one of said pairs of wheels on the associated side of the body by first and second endless loops each of which is engaged with a driving wheel driven by the pump and with a driven wheel connected to an associated one of the ground engageable wheels of said pair and propulsion control means whereby the hydraulic drive means can drive the pair of wheels on one side of the vehicle at the same or a different speed and/direction from the pair of wheels on the other side of the vehicle to propel and steer the vehicle.

The body may be provided with a longitudinally extending loop case compartment on each side of the vehicle, each loop case compartment having a transversely inner wall and a transversely outer wall joined by top and bottom walls and end walls, said stub axle housing member or members being mounted on the outer wall with said driven wheel or wheels disposed within said compartment.

Preferably, two stub axle housing members are provided on each side of the vehicle and each of said housing members are mounted on said outer wall with said driven wheels disposed within the compartment with said driving wheels disposed within the compartment therebetween with said loops engaged with respective driving and driven wheels.

The outer wall may be provided with a circular opening for the or each housing member to provide one of said co-operating guide means.

From a second aspect, the present invention relates to a skid steel vehicle, hereinafter referred to as "of the second kind specified", comprising a body having a front end and a rear end, ground engageable propulsion wheels disposed on opposite sides of the body, each propulsion wheel being driven by a flexible loop from a driving wheel driven by a motor.

A further object of the invention is to provide a new and improved skid steer vehicle of the second kind specified.

According to a second aspect of the present invention, we provide a skid steer vehicle of the kind specified or the second kind specified wherein the driving wheel or wheels are carried on an output shaft of a motor and are unsupported by means independent of the motor.

The body may be provided with a longitudinally extending loop case compartment on each side of the vehicle, each loop case compartment having a transversely inner wall and a transversely outer wall joined by top and bottom walls and end walls.

In both the first and the second aspects of the invention, each pump may be mounted on the inner or the outer wall of an associated loop case compartment with the driving wheel or wheels disposed within the associated loop case compartment.

The driving wheel or wheels are preferably carried on an output shaft of the associated motor and are unsupported by the other wall of the associated compartment.

The output shaft of each motor may be supported at an outer part thereof by an outer bearing carried by a bracket fastened to the respective motor body.

The bracket may be provided with openings to permit of passage of said loop or loops.

The driving wheel or wheels may be provided on a sleeve member which receives the output shaft of the associated motor therein at one end, an inner bearing being provided between the sleeve and the body of the motor.

Preferably, the outer bearing is provided between the bracket and said sleeve.

A brake member may be carried by the output shaft outwardly of said sleeve.

The outer wall of each loop case compartment may be provided with an opening in way of the motor and driving wheel or wheels to permit of manipulation of a loop into driving relationship with a driving wheel and driven wheel.

The brake member may be disposed outwardly of the part of the outer wall of the loop case compartment at locations spaced from said motor and a removable extension housing may be provided to enclose the brake member.

The or each endless loop may comprise a chain such as a roller chain and the driving and driven wheels may comprise sprocket for engagement with the chain.

Alternatively, the or each endless loop may comprise a toothed or untoothed belt and the driving and driven wheels appropriate pulleys.

BRIEF DESCRIPTION OF THE DRAWINGS

An embodiment of the invention will now be described by way of example with reference to the accompanying drawings wherein:

FIG. 6 is a graphical representation of the swash plate angle control member regime for different propulsion control member positions, FIG. 7 is a diagrammatic illustration of a mechanical linkage for use in the vehicle of FIG. 1.

DESCRIPTION OF THE PREFERRED EMBODIMENTS

General Layout

Figures 1, 1A:
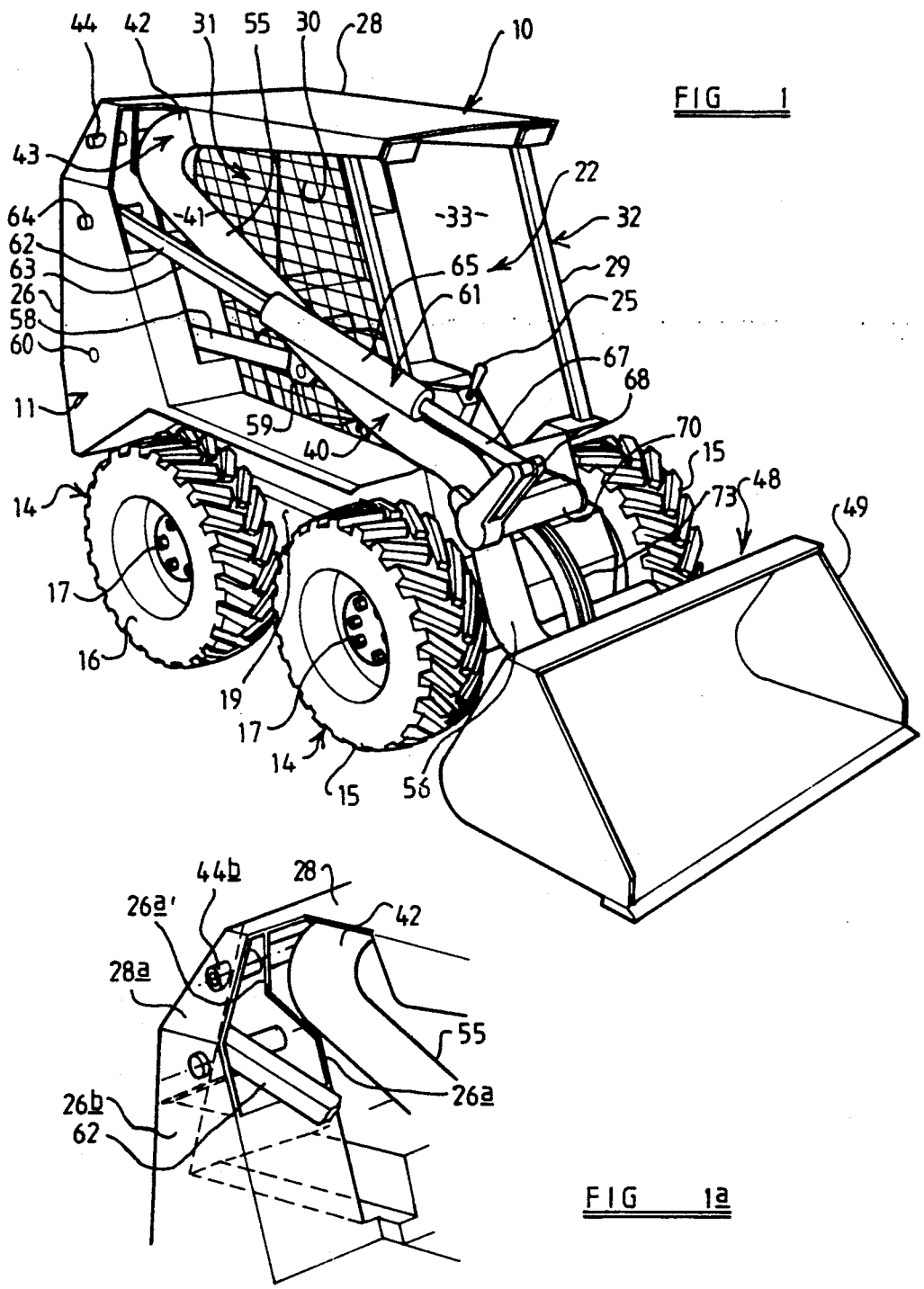
FIG. 1 is a perspective view of a skid steer vehicle embodying the invention.
FIG. 1a is an enlarged fragmentary view of part of FIG. 1 to an enlarged scale.

Referring now to the drawings, a skid steer loader vehicle 10 comprises a body 11 having a front end 12 and a rear end 13. The body 11 is provided with ground engageable propulsion means 14 comprising a pair of front wheels 15 disposed forwardly of a pair of rear wheels 16. The vehicle 10 is propelled in a straight line forwardly or rearwardly by driving all four wheels or, to steer the vehicle, by driving the wheels 15 and 16 on one side at a different speed and/or direction than those on the other side. Such skid steer loaders have a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 15, 16 are carried on stub axles 17 which project outwardly from a pair of transversely spaced side members 18, 19 of the body 10 and which extend fore and aft of the vehicle. Between the side members 18, 19 is a transmission compartment 20 which houses a transmission 21, hereinafter to be described in more detail, whilst above and forwardly of the transmission compartment 20 is an operator's compartment 22 in which is provided an operator's seat 23, manually operable propulsion controls 24 for controlling the speed, selecting forward and reverse movement, and steering the vehicle and manually operable loader controls 25 for controlling a loader arm and material handling implement as hereinafter to be described.

The operator's compartment 22 is also defined by a pair of upstanding members 26, 27 which extend upwardly from the side member, 18, 19 on opposite sides of the vehicle and by a roof 28 which extends forwardly and adjacent its forward end is supported by posts 29.

A wire mesh screen 30 is provided on one side 31, of the operator's compartment 22 for protection of an operator, whilst the other side, 32 of the operator's compartment is unobstructed and provides an access opening 33 whereby an operator can enter and leave the operator's compartment 22.

Behind the transmission compartment 20 and operator's compartment 22 is provided an engine compartment 34 in which an engine 35 of any suitable type is housed. In the present example the engine is an air-cooled diesel engine but any other suitable engine may be provided.

Loader Boom Assembly

The vehicle is provided with a loader arm boom assembly 40 which is disposed adjacent the one side 31 of the operator's compartment 22. The loader arm assembly 40 comprises a lift arm assembly 41 which has a pivot member 42 projecting from an inner end 43 of the lift arm assembly 41 and extends transversely of the body and is pivotally mounted on the body by pivotal mounting means 44, 45 provided on the upstanding members 26, 27 respectively. The lifting arm assembly 41 has an implement carrying member 46 which projects form an outer end 47 of the lifting arm assembly and extends transversely across the front end of the body and has a material handling implement 48 carried thereby so as to be disposed forward of the front end 12 of the body 11. In the present example the implement 48 is an earth moving bucket 49 although if desired other material handling implements may be provided, such as forks.

The pivotal mounting means comprise a pivot boss 44a welded in an aperture provided in an inner plate 27a of the upstanding member 27 and a pivot pin 45 is fixed therein. At its other end the pivot pin 45 is fixed in a further pivot boss 44b which is welded in an aperture in an inner plate 26a of the upright 26 and a downwardly inclined part 28a of the roof plate 28.

At its free end the pivot member 42 has a bearing housing 42a welded therein and the housing 42a carries a bush to rotatably mount the pivot member 42 on the pivot pin 45. At its other end the pivot member 42 has a further bearing housing 42b in the form of a bush welded in an opening formed in the pivot member 42 where it merges into a major part 55 of the lift arm assembly 41 and the bearing housing 42b again houses a suitable bearing bush to pivotally mount the pivot member 42 on the pivot pin 45. The inner plate 26a is cut away in this region, as shown at 26'a in FIG. 1a, to accommodate the boom assembly.

Figure 4:
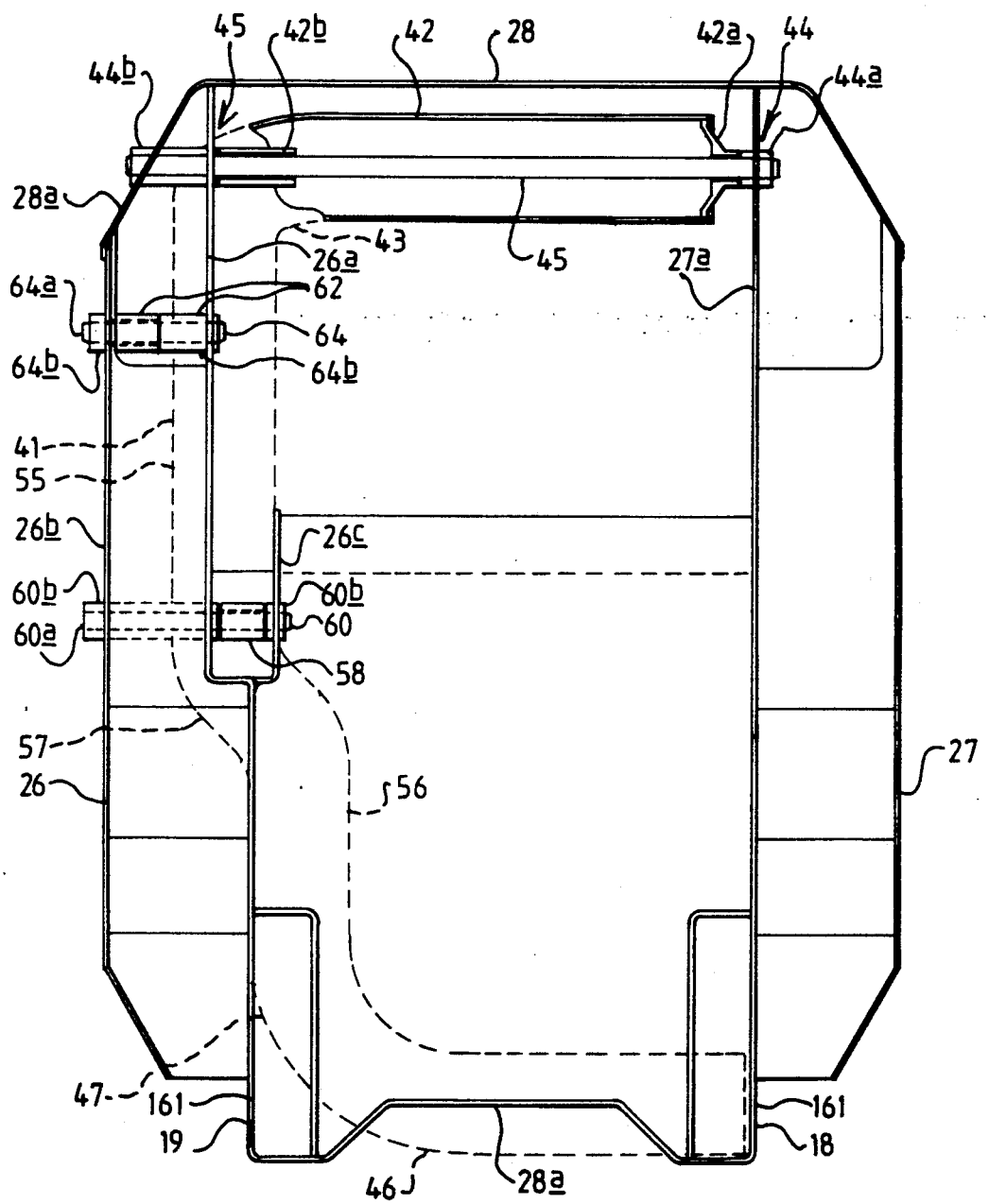
FIG. 4 is a section on the line 4—4 of FIG. 2.
Figure 5:
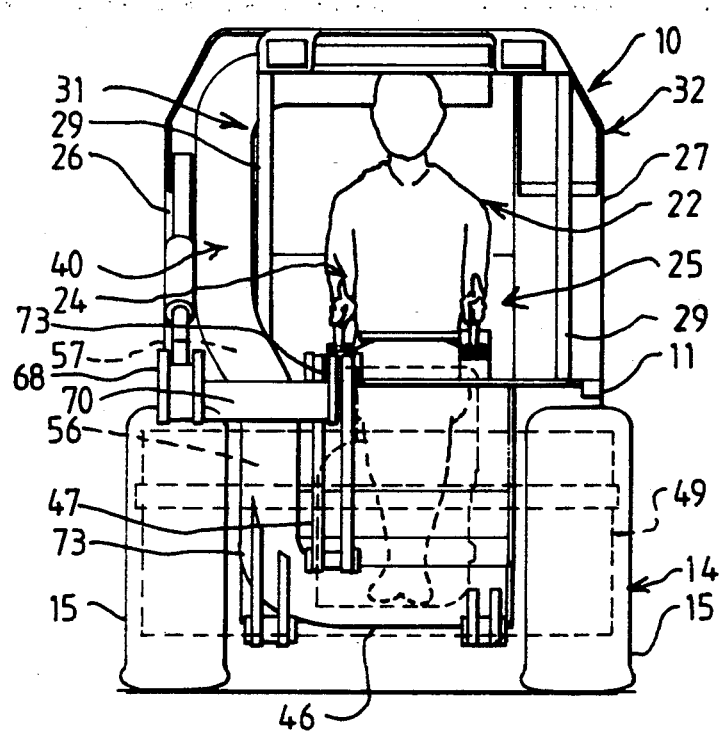
FIG. 5 is a front elevation of the vehicle of FIG. 1 with part omitted for clarity.

The lift arm assembly 41, pivot member 42 and implement carrying member 46 are formed as a unitary member by bending a steel tube to the desired shape. It will be seen that the lift arm assembly 41 comprises a major part 55 which extends generally rectilinearly from the inner end 43 towards the outer end 47 and a minor part 56 which extends generally downwardly and forwardly relative to the main part 55 and is disposed between the main part 55 and the implement carrying member 46. As best shown in FIGS. 4 and 5 an intermediate part 57 is provided between the main and minor parts 55, 56 which is inclined forwardly and transversely inwardly so as to position the minor part 56 within the front wheels 15 and in front of the operator's compartment 22.

A hydraulic lift ram 58 is pivotally connected between a bracket 59 welded to the lift arm assembly 41 and the upstanding member 26 about an axis indicated at 60. The pivotal connection of the lift ram 58 to the upright 26 at the axis 60 comprises a pivot pin 60a which is fixed in pivot bushes 60b welded in openings provided in the inner plate 26a, and an outer plate 26b and a further plate 26c of the upstanding member 26. The cylinder of the ram 58 is pivotally mounted on the pivot pin 60a. The lift ram 58 when actuated is adapted to raise and lower the lift arm assembly 41 between a lower position shown in FIGS. 1 to 4 in full line and a raised position shown in chain dotted line in FIG. 2.

An implement levelling link is indicated generally at 61 and comprises a first link 62 which comprises a bar 63 pivotally connected to the upstanding member 26 about an axis 64 and connected to a ram 65 from a cylinder 66 of which a piston rod 67 projects forwardly and is pivotally connected to one end of a first level 68. The pivotal connection of the first link 61 comprises a pivot pin 64a fixed in pivot bushes 64b welded in apertures in the inner and outer members 26a, 26b respectively whilst the bar 63 is pivotally mounted on the pivot pin 64a.

The first lever 68 is pivotally mounted on the lift arm assembly 41 by a pivot member 69 and is connected by a torque tube 70 to a second lever 71 which is pivotally connected at its outer end 72 to a second, fixed length link 73 which is pivotally connected to the bucket 49 as shown at 74.

The respective positions of the axis of pivot of the lift arm assembly 41 provided by the pivot pin 45 and the connection of the implement levelling link to the upstanding member 26 at axis 64 together with the length of the first and second levers 68, 71 and the position of pivotal connection of the second link 73 to the bucket 49 at 74 together with the position of pivotal connection of the bucket 49 to the implement carrying member 46 at 75 is arranged so as to provide a linkage which ensures that the orientation of the bucket 49 relative to the body is preserved irrespective of the angular position of the lift arm assembly 41 so long as relative movement does not occur between the piston rod 67 and cylinder 66.

Figure 2:
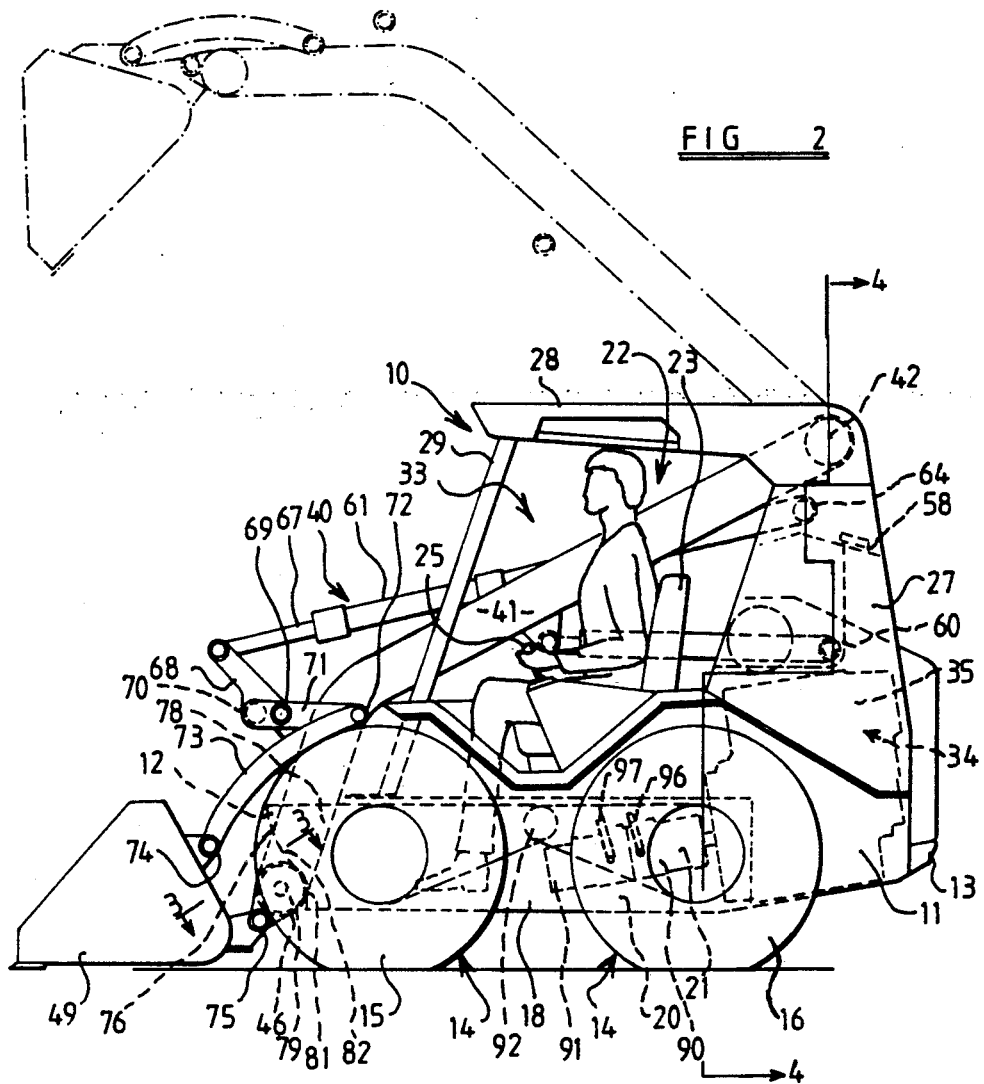
FIG. 2 is a side elevation of the vehicle of FIG. 1 but showing the opposite side thereof to that shown in FIG. 1.
Figure 3:
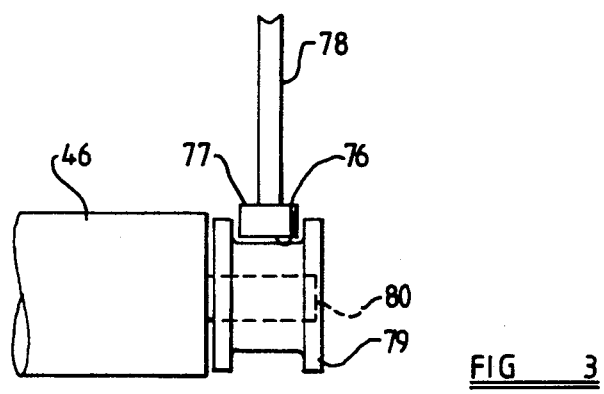
FIG. 3 is a section on the line 3—3 of FIG. 2.

When it is desired to pivot the bucket upwardly, i.e. cause it to rotate about the axis 75 in a clockwise direction as viewed in FIG. 2, fluid is supplied to the cylinder 65 to act on the larger diameter side of the piston therein so as to force the piston rod 67 out of the cylinder 65 so that the above described linkage causes the desired clockwise movement of the bucket 49. Such movement is generally required in operation to lift or tear out earth and hence is known as "tear out" movement. Because the fluid is operative upon the whole cross-sectional area of the piston a relatively high power action is provided in this direction.

When it is desired to rotate the bucket in an anticlockwise direction as shown in FIG. 2, commonly known as "dumping" then fluid is supplied to act on an annular surface of the piston surrounding the piston rod 67 so that a smaller cross-sectional area is acted upon and therefore a faster, although less powerful action, is provided.

At the front end 12 of the side member 18 there is provided an abutment surface 76 provided by a bar 77 welded to a cam plate extension 78 of the side member 18. The bar 77 is adapted to abut a flanged roller 79 rotatably mounted on a spigot 80 projecting from the free end of the implement carrying member 46. The abutment surface 76 comprises a lower, generally vertical surface part 81 and a forwardly and upwardly inclined part 82, the surface parts 81 and 82 being contoured to co-operate with the roller 79 as the lift arm assembly 41 approaches its lowermost position and to prevent rearward displacement of the free end of the implement carrying member 46 when in such a lower position, for example, when driving a vehicle forwardly to load the bucket 49. If desired the abutment surface 76 may be extended upwardly so as to support the member 46 over a greater height.

From the foregoing it will be seen that boom assembly 40 extends forwardly from a position adjacent the rear end of the body 11 alongside the one side 31 of the operator's compartment 22 whilst the other side 32 is unobstructed so that an operator can gain access to the compartment through the access opening 33.

By providing the axis of pivot of the lift arm assembly 41 adjacent the top rear corner of the operator's compartment the operator is provided with the ability to lift the bucket to a relatively great height and at the same time provide the bucket with good reach and the vehicle with a stability. For example, the axis of pivot of the lift arm assembly is approximately 1.5 m above the ground in the example illustrated, whilst the distance between the axis of pivot of the lift arm assembly and the axis of pivot of the bucket about the axle 75 is approximately 2.5 m. Hence the vehicle has a total lift of approximately 3 m and over the whole of this range of lift the pivotal connection 75 to the bucket lies forwardly of the front end 12 of the vehicle.

Propulsion and Loader Controls

The transmission 21 comprises a pair of conventional swash plate hydrostatic pumps 90, 91 the output of which is sent, in conventional manner, to a conventional hydrostatic motor 92. In this example the rearmost pump 90 provides a feed to the motor 92 on the left-hand side of the vehicle whilst pump 91 provides feed to the corresponding pump, not shown, on the right-hand side of the vehicle.

The pumps 90, 91 each have an input member 93, 94 respectively which are rotatable about spaced parallel axes which extend perpendicular to a fore and aft axis of the vehicle and which lie in a substantially horizontal plane.

The input members 93, 94, in the present example, control the angle of the swash plates of their associated hydraulic pump through the intermediary of a hydraulic servo mechanism in-built into the hydraulic pump in conventional manner. If desired, however, the input members 93, 94 may directly mechanically actuate the angle of the swash plates again in conventional manner.

The vehicle is provided with a suitable linkage to connect the manually operable propulsion control means 24 to the input members 93, 94 in order to achieve a desired regime of swash plate angle control. Such a regime is illustrated in FIG. 6 which shows the desire swash plate angle and hence desired input member 93, 94 positioned for different positions of propulsion control member angular position. The graphical representation of FIG. 6 assumes that the propulsion control member 95 is, in each angular position moved to fullest extent possible but the same pattern of swash plate control would be achieved for lesser amounts of movement in any particular direction although the extent of movement of the swash plates of each pump would be correspondingly reduced.

When the control member 95 is moved to its fully forward position, i.e. parallel to the fore and aft direction of the vehicle (referred to in FIG. 6 as 0°) both input members 93, 94 are rotated, in the example illustrated, in a clockwise direction as viewed in FIG. 2 or FIG. 7 so as to cause forward movement of both the left-hand and right-hand propulsion means.

When the lever is moved 45° to the right (referred to in FIG. 6 as 45°) the linkage causes the input member 94 to adopt a position at which the swash plates deliver no fluid to the motor, i.e. a neutral position, whilst the input member 93 of the swash plate which drives the left-hand motor 92 is maintained in its fully forward position so that the vehicle is caused to turn to the right.

Movement of the member 95 in a direction at 90° to the right (referred to in FIG. 6 as 90°) causes the input member 94 to move to signal the swash plates to move fully to a reverse drive position whilst the input member 93 is maintained in its fully forward position and hence the vehicle is caused to turn on its axis.

Movement of the control member 95 to a position 135° to the right causes the input member 94 to be maintained in its full reverse position whilst the input member 93 is moved to a neutral position in which no output is produced by the swash plates.

When the lever 95 is moved in a reverse direction parallel to the fore and aft axis of the vehicle, (referred to in FIG. 6 as 180°) the input member 94 is maintained in its full reverse position whilst the input member 93 is moved to a full reverse position.

A similar sequence of movements occurs when the lever 95 is moved to corresponding positions to the left, referred to in FIG. 6 as 225°, 270° and 315°.

A mechanical linkage which aims to provide the above described regime is illustrated in FIG. 7. Each input member 93, 94 is provided with an input lever 96, 97 respectively and these levers are connected by ball joints at positions A1, A2 to respective links 98, 99 which are connected by ball joints at A3, A4 to the lower end of an operating lever 100. The points A1, A2, A3, A4 all lie in a plane which is parallel to and spaced above a plane which contains the axes of rotation of the input members 93, 94.

The operating lever 100 is pivotally mounted to a part 101 of the body 11 for universal movement by virtue of a parallelogram linkage 102. The linkage 102 comprises a first Hookes joint 103, one yoke 104 of which is fixed to the top end of the operating lever 100 and is also fixed to one yoke 105 of a second Hookes joint 106, the other yoke 107 of which is fixed to the part 101 of the body. The second yoke 108 of the first Hookes joint 103 is connected by a link 109 to a first yoke 110 of a third Hookes joint 111, the second yoke 112 of which is connected to a first yoke 113 of a fourth Hookes joint 114, the second yoke 115 of which is fixed to the part 101 of the body. In addition, the second yoke of the third hooks joint 111 carries the propulsion control member 95. Thus movement of the control member 95 in any one of the radial directions described hereinbefore permitted by the fourth Hookes joint 114 will be transmitted by the link 109 and Hookes joint assembly 103, 106 to the operating lever 100. The line joining the points B of connection of the Hookes joints 106 and 114 to the part 101 of the body lies parallel to a line joining the parts A1, A2 but in a plane spaced above the plane containing the parts A1–A4.

Hence movement of the propulsion control member 95 in, for example, the forward direction F parallel to the fore and aft axis of the vehicle will cause a corresponding movement of the points A3, A4 in the reverse direction Rv which will cause the input members 93, 94 to rotate in a clockwise direction to provide an output to the pumps to cause the vehicle to advance forwardly. Similarly, movement of the control member 95 in the reverse direction Rv will cause movement of the points A3, A4 in the forward direction F and the corresponding anti-clockwise rotation of each of the input members 93, 94 to provide reverse movement of the vehicle.

Movement of the lever 95 in the direction R, i.e. to the right of the vehicle at right-angles to the fore and aft axis, causes movement of the points A3, A4 to the left to cause the input member 93 to rotate in a clockwise direction so that the left-hand ground engageable propulsion unit is driven forwardly whilst the input member 94 is rotated in an anti-clockwise direction to cause the right-hand ground engageable propulsion unit to rotate in a reverse direction, thereby causing the vehicle to spin on its axis.

If the member 95 is moved to the left in the direction of the arrow L, then the points A3, A4 are moved to the right in the direction of the arrow R thus causing the member 93 to rotate anti-clockwise to cause the left-hand propulsion unit to provide reverse drive whilst the input member 94 is caused to rotate clockwise so that the right-hand propulsion unit is caused to rotate forwards, again causing the vehicle to rotate on its axis but in the reverse direction, i.e. to the left.

Movement of the lever 95 at 45° to any one of the direction described hereinbefore causes a combination of motions to take place. For example, if the control lever 95 is moved 45° to the right, i.e. midway between the forward and right-hand positions illustrated in FIG. 7, then there will be a corresponding movement of the points A3 and A4 at 45° midway between the Rv and L directions shown in FIG. 7 having the effect of maintaining the input member 94 in its neutral position so that no drive is provided to the right-hand ground engageable propulsion means whilst the input member 93 is moved fully clockwise to provide full forward drive to the left-hand propulsion means, thereby causing the vehicle to steer to the right. A corresponding combination of motions occurs for movement of the lever 95 at other 45° angles and at other positions a combination of motions of the control members 93, 94 is obtained substantially in accordance with FIG. 6.

In one particular example the dimensions of the linkage are as follows, although it will, of course, be appreciated that other dimensions may be provided as will be apparent to a person of skill in the art.

| Dimension | mm |
| --- | --- |
| C | 240 |
| D | 150 |
| E | 100 |
| G | 50 |
| H | 30 |
| I | 180 |
| J | 45 |
| K | 305 |
| M | 90 |
| N | 50 |
| P | 440 |

The control force ratio between sideways movement of the control member 95 and the forward and reverse movement can be varied by altering the length of the links 99 which, in the illustrated example are 150 mm long, which with a distance between the points A1, A2 in the neutral position of the pumps of 240 mm gives a 45° angle between the links 98 and the line joining the points A1, A2. By making the links longer the force required for sideways movement of the member 95 will be greater and the extent of sideways travel smaller and would give the control member 95 a bias towards straight line travel.

Figure 8:
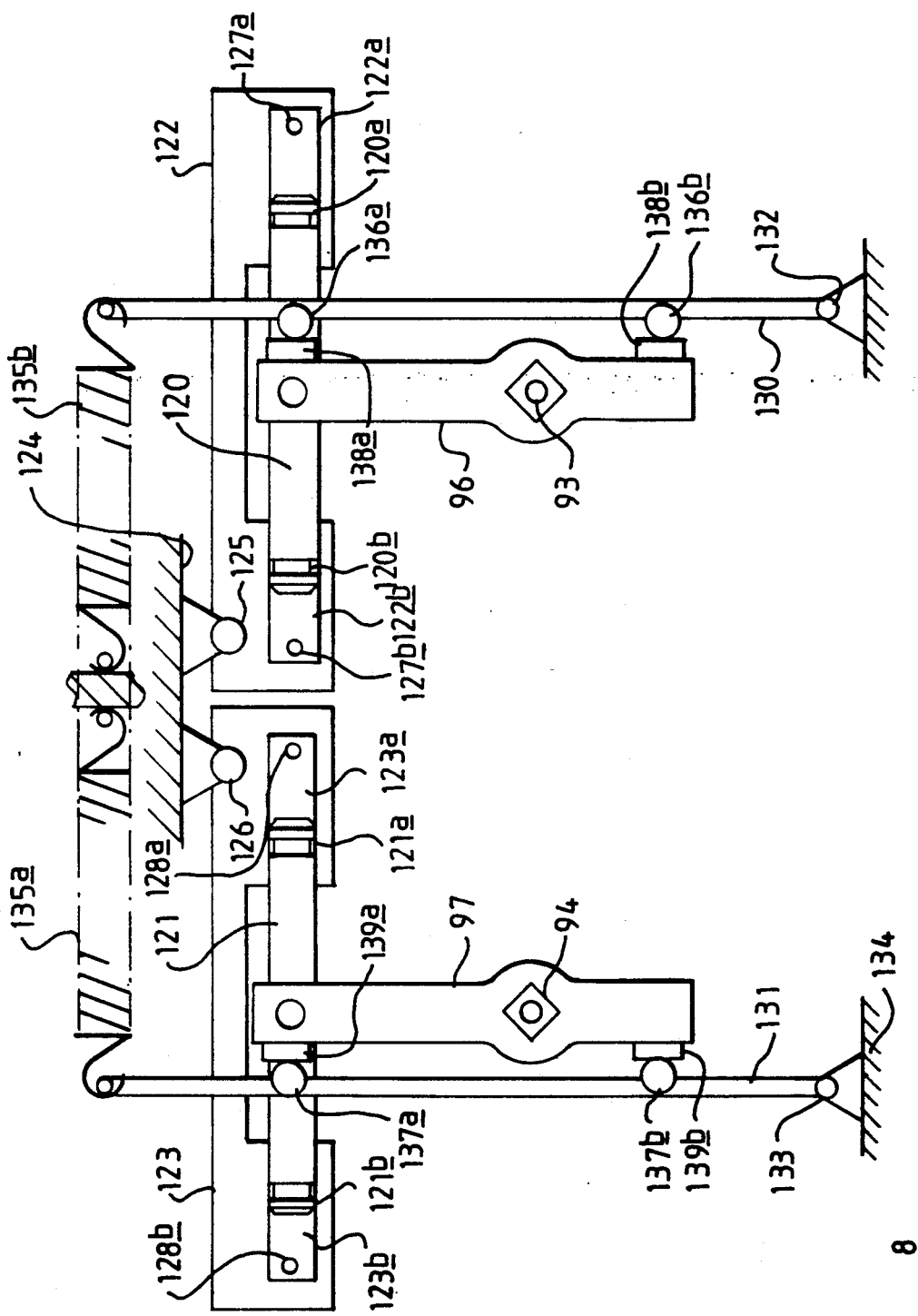
FIG. 8 shows part of a hydraulic linkage for use in the vehicle of FIG. 1.

FIG. 8 illustrates an alternative hydraulic linkage in which the hydrostatic pumps and motors are as described in connection with the FIG. 7 embodiment and the input members 93, 94 again have input levers 96, 97 respectively. However, the levers 96, 97 are connected to piston rods 120, 121 of double acting hydraulic rams 122, 123 respectively. The hydraulic rams 122, 123 are pivotally mounted to a part 124 of the body 11 about vertical axes 125, 126 respectively which are parallel to the axis of rotation of the input members 93, 94.

The piston rods 120, 121 are provided with piston heads 120a, 120b; 121a, 121b respectively and the rams 122 are provided with corresponding cylinders 122a, 122b; 123a, 123b respectively which are provided with inlet ports 127a, 127b; 128a, 128b respectively.

Each input lever 96, 97 is associated with a centring lever 130, 131 respectively which are pivotally mounted as shown at 132, 133 to a fixed part 134 of the body 11.

The centring levers 130, 131 are pivotally biased together by coil tensions springs 135a, 135b and carry balls 136a, 136b; 137a, 137b respectively which engage abutment parts 138a, 138b; 139a, 139b respectively of the input levers 96, 97. If desired, instead of two springs a single spring inter-connecting the levers 130, 131 may be provided. The pivots 132, 133 are positioned so that when the input members 93, 94 are in their neutral positions so that the swash plates are providing no output the abutment portions 138a, 138b; 139a, 139b are each engaged by their associated ball 136a, 136b; 137a, 137b of the associated centring lever 130, 131 so that the input members 93, 94 are biased towards their neutral position from any displacement in either direction therefrom and hence are normally maintained in their neutral position in the absence of any input. It should be appreciated that the above described centring means may be equally applied to the mechanical linkage described with reference to FIG. 7 but has not been illustrated in FIG. 7 for clarity.

Figure 9A:
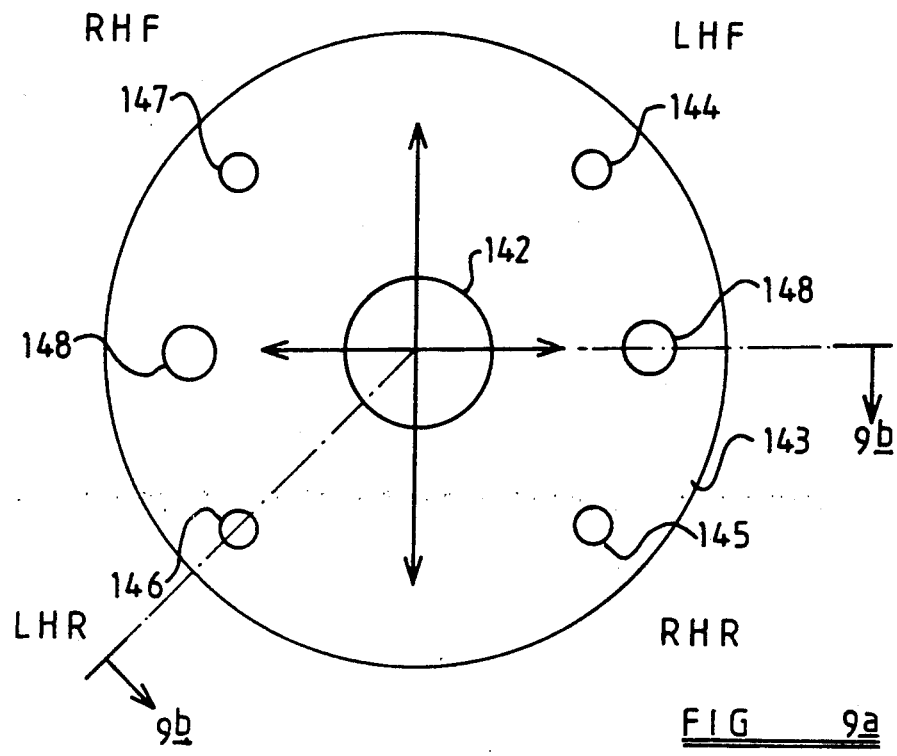
FIG. 9a is a diagrammatic plan view of a propulsion control lever for use with the linkage of FIG. 8.
Figure 9B:
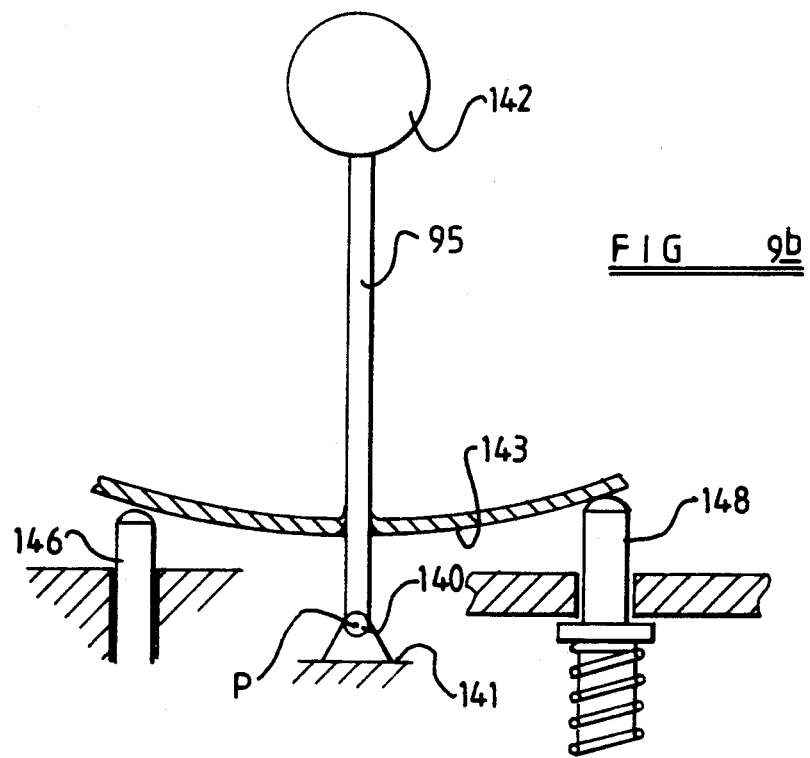
FIG. 9b is a diagrammatic cross-section on the line 9b-9b of FIG. 9a, and FIG. 10 is a diagrammatic illustration of an alternative form of mechanical linkage utilising flexible cables.

Referring now to FIGS. 9a and 9b, the propulsion control member 95 is universally mounted about a point P by a suitable universal joint 140 to a base part 141 which, in the present example, is fixed relative to the body 11.

At its upper end the control member 95 has a knob 142 which can be grasped by the operator.

Adjacent the lower end of the member 95 is a valve operating surface member 143 which provides a part spherical valve operating surface which is engaged by valve operating plungers 144–147 which are disposed at equal distances from the universal joint 140 and on planes containing the point of pivot of the joint 140 and are equally angularly spaced therearound lying in planes indicated at 45° to a line through the joint 140 and parallel to the fore and aft axes of the vehicle.

The plungers 144–147 are spring biased into engagement with the surface member 143 and, in themselves, would tend to bias the member 95 into a vertically upward position as shown in FIG. 9b with an equal bias to return the member 95 to the neutral position when displaced therefrom in any direction.

In order to provide a bias towards movement of the control member 95 in a forward and reverse direction two further spring bias plunger members are provided as illustrated at 148 and disposed on opposite sides of the universal joint 40 on a line perpendicular to the fore and aft axis of the vehicle. The spring bias provided by the plungers 148 is significantly stronger than that provided by the plungers 144 thus a stronger bias to return the member 95 to the vertical occurs when the member 95 is displaced from the vertical to the left or the right than when it is displaced from the vertical in a forward or reverse direction. This provides the vehicle with a bias towards forward and reverse movement of the member 95 with stronger operator force being required to cause steering movement of the vehicle to the left or the right thereby facilitating forward or reverse driving of the vehicle and in addition making the vehicle safer.

The valve operated by the plunger 144 is arranged to feed hydraulic fluid under pressure when the plunger 144 is depressed to the port 127b of the ram 122 to cause the input member 93 to rotate clockwise to provide forward drive to the left-hand propulsion unit. Similarly, the plunger 147 is arranged to cause its associated valve to feed fluid to the port 128b of the ram 123 to cause the input member 94 to operate the right-hand propulsion unit in a forward direction.

Depression of the plunger 145 causes its associated valve to feed fluid to the port 128a of the ram 123 to cause the member 94 to rotate in an anti-clockwise direction and to cause the right-hand unit to drive in reverse, whilst depression of the valve member 146 causes its associated valve to feed fluid under pressure to the port 127a of the ram 122 to cause the member 93 to rotate anti-clockwise to cause the left-hand unit to drive in reverse.

When the member 95 is moved to the right plungers 144 and 145 are depressed causing forward movement of the left-hand unit and reverse movement of the right-hand unit so that the vehicle spins on its axis to the right. Similarly, movement of the member 95 to the left depresses the plungers 146 and 147 to cause the left-hand unit to rotate in reverse and the right-hand unit to operate forward to cause the vehicle to spin on its axis in a left-hand direction.

When the lever 95 is moved at 45°, for example, at 45° between the forward and right directions, the valve 144 only is depressed so that the left-hand unit is caused to drive forward whilst the right-hand unit remains at its neutral position since neither of its operating plungers 145 or 146 are depressed. A similar depression of only one plunger occurs at each of the 45° positions with associated movement only of one of the propulsion units in accordance with the regime of FIG. 6. Movement of the control member 95 to positions intermediate the 45° positions described hereinbefore causes a combination of movements in accordance with the valve members which are depressed and their extent of depression.

In the above described hydraulic linkage system the maximum displacement possible of the propulsion control member 95 in terms of its angular rotation about a horizontal axis passing through the point P varies in accordance with whichever of the various directions in which it is displaced. For example, when the control member 95 is moved in a forwards direction so that the valve operating members 144 and 147 are displaced downwardly, then for a given extent of valve operating member displacement the control member 95 will move forwardly further than would be the case if it were moved, for example, at 45° to the right so that only the valve member 144 were displaced downwardly. This is because the radial distance of the line of action of the valve operating members 144, 147 is closer to the axis of pivot of the member 95 than is the valve operating member 144, thus the control member 95 is moved to a greater extent in each of the forward, reverse and left and right positions compared with intermediate positions at 45° therebetween and the upper line in FIG. 6 illustrates this.

A similar differential in the extent of control member movement occurs with both the rigid mechanical linkage described above and the flexible mechanical linkage now be be described.

Figure 10:
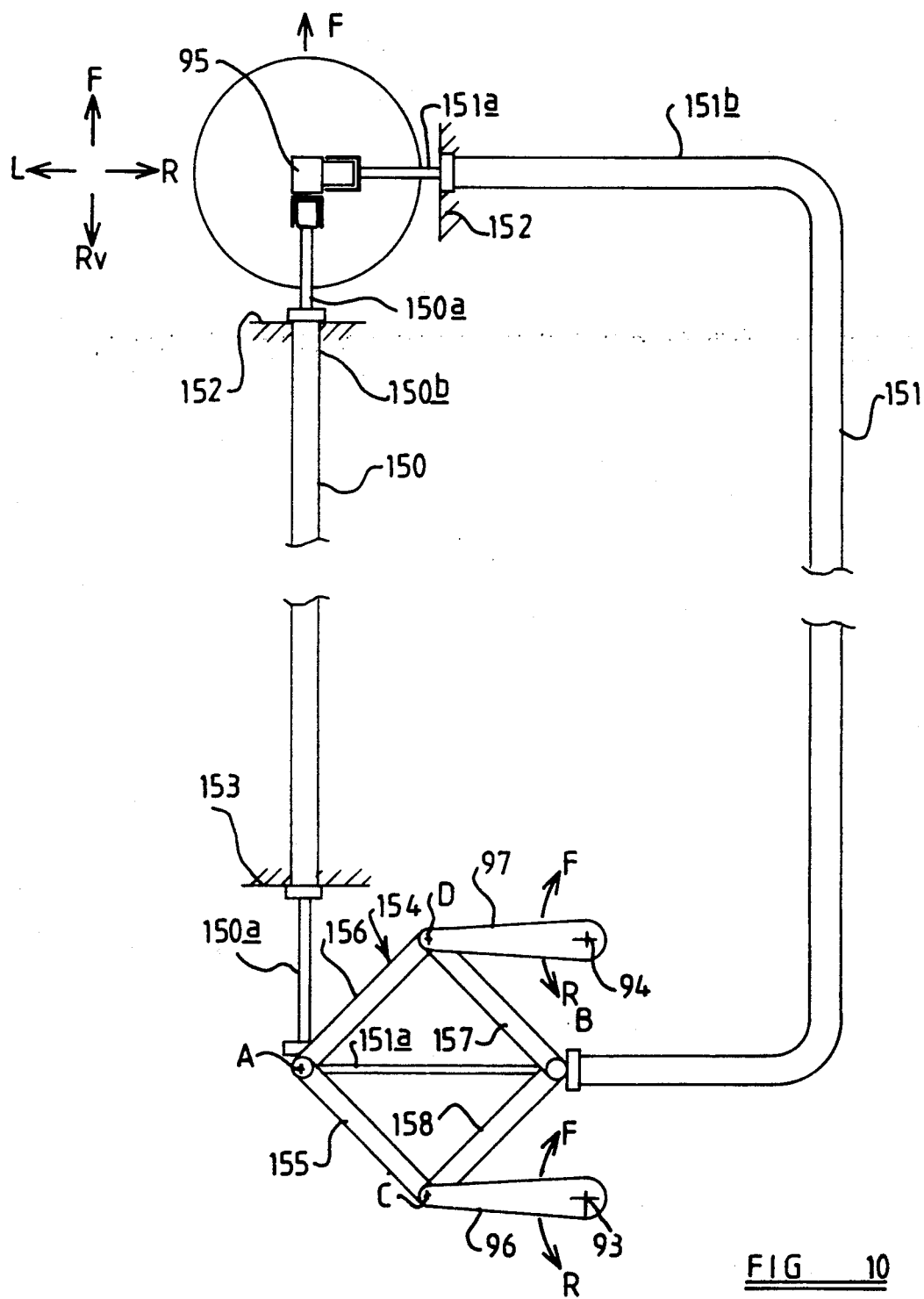

Referring now to FIG. 10, there is shown an alternative mechanical linkage utilising a pair of flexible push-pull cables 150, 151. An inner member 150a of the cable 150 is connected to the propulsion control member 95 so that forward movement, F, of the member 95 pulls the inner member 150a out of its outer case 150b whilst reverse movement Rv of the lever 95 pushes the inner member 150a relative to the outer member 150b all with respect to a neutral position of the lever 95. Similarly, the inner member 151a of the other cable 151 is connected to the member 95 so that movement of the lever 95 to the left, L, from a neutral position pulls the inner member 151a out of its outer member 151b whilst movement of the member 95 to the right R, pushes the inner member 151a into its outer member 151b.

The outer members 151b and 151b of the cables 150, 151 are anchored, at their ends adjacent the member 95 to a fixed part 152 of the body 11.

At its other end the outer member 150b is anchored to a fixed part 153 of the transmission 21 whilst the inner member 150a at this other end is pivotally connected to a parallelogram linkage 154 at point A.

The outer part 151b of the cable 151 is anchored at its other end to the parallelogram linkage 154 at point B whilst the inner member 151a at this other end is anchored to the linkage at point A.

The linkage comprises four equal-length links 155–158. The links 155 and 156 are connected together at their one ends and to the inner members 151a, 150a at point A. At its other end link 155 is connected to input lever 96 at point C which is also connected to link 158 the other end of which is connected to the outer member 151b at point B and also connected, at this point, to link 157 the other end of which is connected to input lever 97 at point D to which link 156 is also connected.

In use, movement of the lever 95 in a forward direction, F, will pull the inner member 150a through the outer member 150b so as to cause the point A of the linkage to move up right in FIG. 10 and hence to cause both input levers 96, 97 to rotate clockwise to cause both pumps to cause forward drive of their associated propulsion means. Movement of the lever 95 from the neutral position in the rearward direction Rv will cause movement of the point A down in FIG. 10 and hence anti-clockwise movement of the input members 93, 94. Movement of the lever 95 to the right, R, will cause movement of inner member 151a to move the point A to the left to cause the input levers 96, 97 to rotate in opposite directions so that the points C and D approach and hence so that input member 93 rotate clockwise to cause forward driving movement of the left-hand propulsion unit, whilst the input member 94 rotates anti-clockwise to cause reverse movement of the right-hand propulsion unit.

When the member 95 is moved to the left, L, from a neutral position then the member 151a will be moved to move the point A to the right so that the input levers 96, 97 will rotate in opposite directions away from each other so that input member 93 is caused to rotate anti-clockwise to give reverse drive at the left-hand propulsion unit whilst the input member 94 is caused to rotate clockwise to give forward drive to the right-hand propulsion unit.

When the lever 95 is moved to a position at 45° to any of the orthogonal positions described hereinbefore, for example 45° to the right between the forward and right positions, the linkage will move such that the operating lever 97 of the pump to the right-hand propulsion unit will remain in its neutral position shown in FIG. 10 whilst the operating lever 96 to the left-hand pump will be moved to its forward position and a similar combination of motions to achieve the regime shown in FIG. 6 will be achieved for other directions of movement of the lever 95 in an analogous manner to the motions described hereinbefore in connection with the other mechanical linkage and hydraulic linkage.

Motor and Stub Axle Mounting

The side members 18, 19 each comprise a loop case compartment and as best shown in FIG. 4 each comprise a transversely inner wall 160 and a transversely outer wall 161 which are joined by top and bottom walls 162, 163 and end walls 164, which provide an oil tight compartment.

It will be seen that the outer walls 161 provide main chassis members of the vehicle body and that at the rear of the vehicle extensions of the outer walls provide the inner side plate of the upstanding members 26, 27. In addition, a transversely extending member 165 interconnects the main chassis members 161 together and provides a floor to the body.

The loop case compartments 18, 19 have mounted thereon, at the positions shown in FIG. 2 and FIG. 1 respectively, the ground engageable propulsion wheels 15, 16 and the motors 92.

Figure 11:
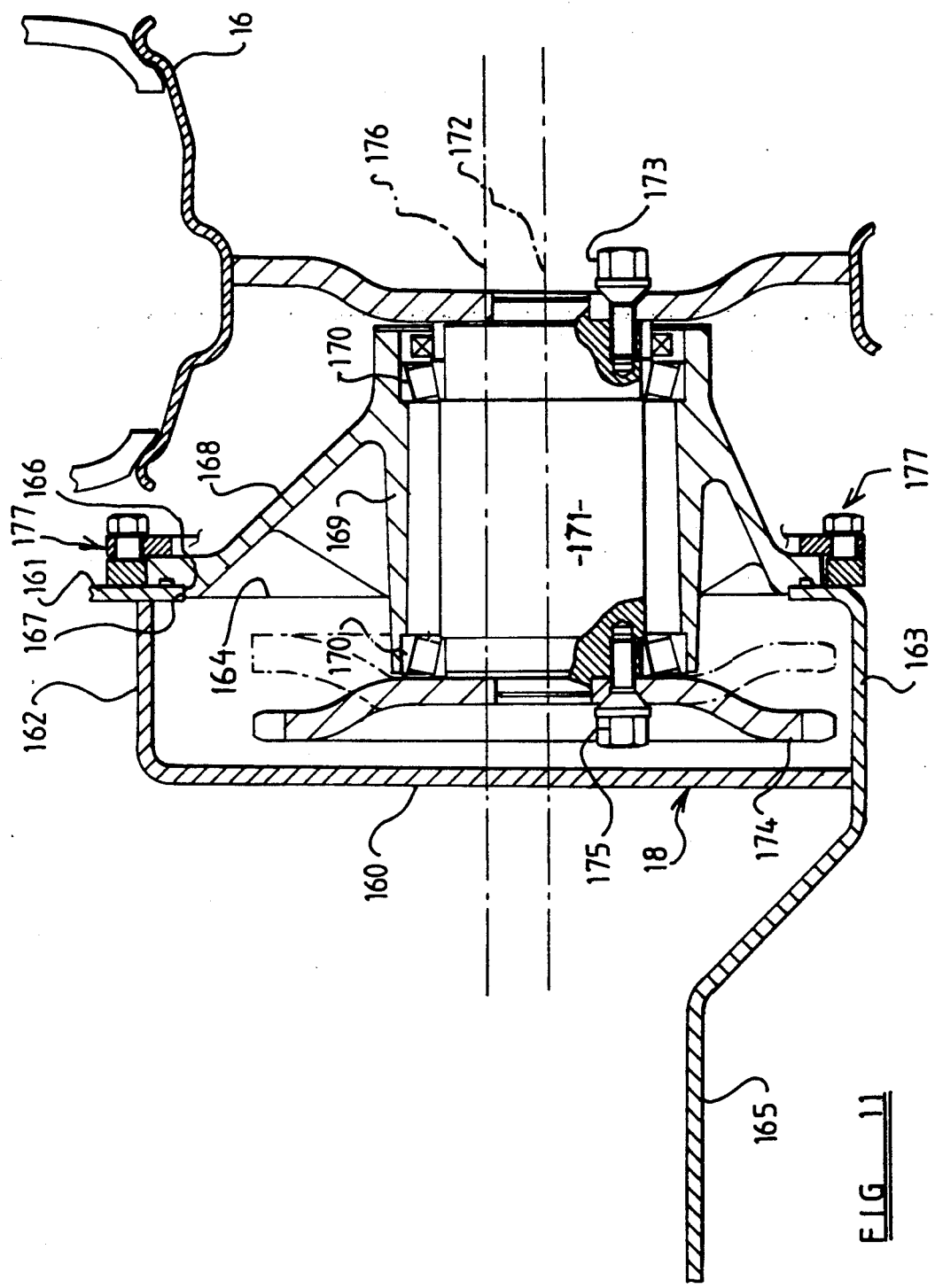
FIG. 11 is a fragmentary transverse cross-section, to an enlarged scale, to the vehicle of FIG. 1 showing a stub axle housing assembly.

Referring now particularly to FIG. 11, there is illustrated the mounting of one of the ground propulsion wheels 16 on the loop case compartment 18 although it should be appreciated that each of the four wheels is mounted on its associated loop case compartment in exactly the same manner and do not require separate description.

At the location of the wheel 16 the outer wall 161 is provided with a circular opening 166 which provides a first guide means which co-operates with a second guide means provided by a shoulder 167 of a carrier member 168 of generally frusto-conical configuration and formed integrally with a stub axle housing member 169. The stub axle housing member 169 carries taper roller bearings 170 so that a stub axle 171 is housed by the member 169 so as to be rotatable about an axis of rotation 172.

The wheel 16 is bolted to one end of the stub axle 171 in conventional manner by bolts 173 whilst a driven wheel in the form of a sprocket 174 is bolted to the other end of the stub axle 171 by bolts 175.

The stub axle and its housing, together with the carrier member 168 are configuration so that the sprocket 174 is disposed within the loop case compartment 18. The teeth of the sprocket 174 are offset from a central mounting part of the sprocket so that the sprocket can be fastened to the stub axle 171 in a reverse orientation, shown in chain line in FIG. 11, when attached to the stub axle for the other wheel on the same side of the vehicle.

The carrier member 168 is formed so that the axis of rotation 172 of the stub axle 171 is eccentrically disposed relative to the central axis of the rebate 167 and hence relative to a reference axis 176 about which the carrier member 168 is guided to rotate by co-operation between the hereinbefore mentioned guide surfaces 166, 167.

Clamping means, such as an annular ring 177, are provided to enable the carrier member 168 to be clamped to the outer wall 161 in any desired angular orientation around the reference axis 176.

By the above described eccentric disposition of the axis 172 relative to the axis 176, the position of the axis 172 both longitudinally and vertically of the vehicle can be adjusted thereby permitting of adjustment of the wheel base of the vehicle, in association with driving chains of appropriate lengths, as well as permitting of adjustment of the ground clearance of the vehicle together with providing a facility for tensioning a chain of a given length.

It will be seen that the stub axle 171 is supported solely from the side wall 161 without any support being afforded by the inner wall 160 thereby avoiding the need to effect any machining operations on the wall 160 which would otherwise be necessary if the stub axle were additionally supported thereby.

In addition, a clearance is provided between the sprocket member 174 and the wall 160 to permit of manipulation of a chain through the space and hence into driving relationship with the teeth of the sprocket 174.

Figure 12:
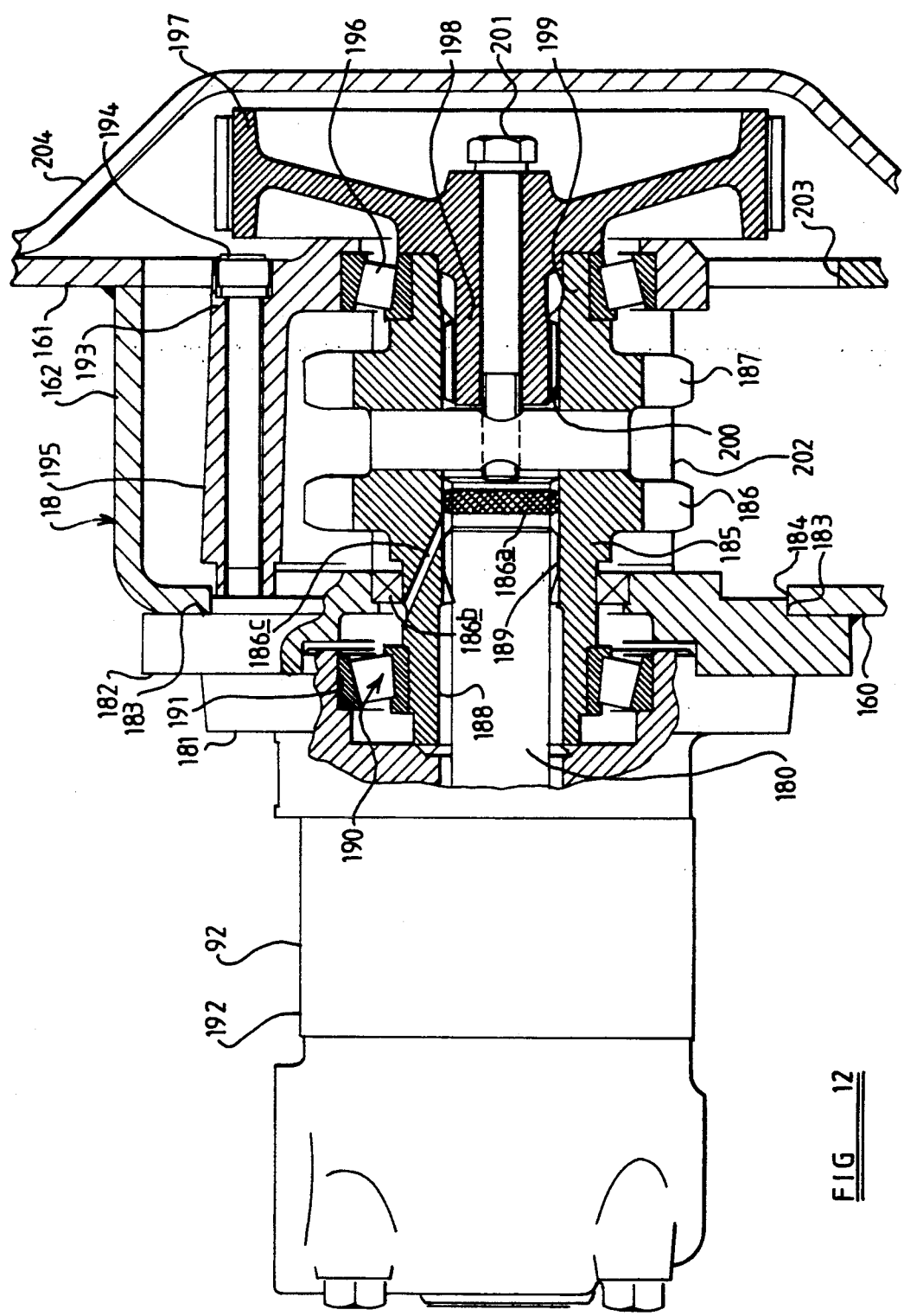
FIG. 12 is a fragmentary transverse cross-sectional view, to an enlarge scale, to the vehicle of FIG. 1 showing a motor assembly.

Referring now to FIG. 12, there is shown the mounting of a motor 92 on the loop case compartment 18.

The motor 92 is a conventional commercially available high torque motor and has a conventional output shaft 180. The motor 92 has a mounting flange 181 by which it is bolted to a mounting plate 182 welded to the inner wall 160 of the compartment 18. The mounting plate 182 has a rebate 183 which is received within a circular aperture 184 formed in the wall 160 to aid location of the ring 182.

A sleeve 185 is machined to provide a pair of driving wheels in the form of sprockets 186, 187 and an inner part 188 of the central passage of the sleeve 185 has the output shaft 180 received therein with a splined connection 189 provided therebetween.

A seal 186a is provided in the central passage and a shaft seal 186b is also provided so that lubricating oil for the splined connection 189 supplied from the motor 92 is caused to flow via bore 186c to lubricate the bearing 190 before returning to the motor.

A taper roller bearing 190 is provided between the external surface of the sleeve 188 and a seat 191 provided by the body 192 of the motor 92.

A bracket member 193 in the form of a three-legged spider is bolted to the pump body 192 by bolts 194, only one leg 195 and one bolt 194 being shown in FIG. 12, the other two legs and bolts being equally angularly disposed around the axis of rotation of the output shaft 180A further taper roller bearing 196 is provided between the bracket 193 and an outer surface part of the sleeve 185.

A brake drum 197 is formed with a boss 198 which is received within an outer part 199 of the central passage of the sleeve 185 and is retained in splined engagement therewith, as shown at 200 by a bolt 201. The sleeve is provided with a transversely extending passage 202 to receive a locking pin for the bolt 201.

Chains, such as roller chains, not shown, are looped around the respective sprockets 186, 187 and the respective driven sprockets 174 and the sprocket, not shown, of the other wheel.

To assemble the sprocket and chain drive, initially the chains are manoeuvred into the compartment 18 through an opening 203 provided in the outer wall 161 and are passed between the inner wall 160 of the compartment 18 and the respective driven sprocket such as the sprocket 174. At this stage, although the motor 92 is bolted in position, the sleeve 185 and bracket 195 are absent.

The sleeve 185 is then offered up the outward shaft 180 and the chains are then manoeuvred over the outer end of the sleeve 185 and into position on their associated sprockets 186, 187. The hereinbefore described eccentric mounting of the stub axles permits the stub axle axes 172 to be moved towards the motor 92 to provide sufficient slack in the chain for the above manipulation to occur.

The bracket member 195 is then bolted in position with the chains passing through the spaces between the legs 195 thereof. Thereafter the brake drum 197 is bolted in position and finally an extension housing enclosure member 204 is bolted in fluid tight relationship to the outer wall 161.

In the assembly described with reference to FIG. 12, the output shaft 180 and the associated driving sprockets 186, 187 and brake drum 197 are supported entirely from the motor through the bracket 195 and receive no support from any component which is independent of the motor and in particular do not receive any support from the outer member 161. It is therefore unnecessary to perform any machining operation on the member 161 other than the simple information of the clearance opening 203 which may be made, for example, by flame cutting.

If desired, the motor described above may be mounted on the outer wall 161 instead of the inner wall.

Instead of driving the stub axles from a shaft motor through loops, if desired, the stub axles may be driven by other means such as, by providing a separate motor which may drive each stub axle directly. In this case, if desired the above described eccentric mounting may also be provided with the motor similarly moving eccentrically with the stub axle.

Operator Restraint

Figure 13:
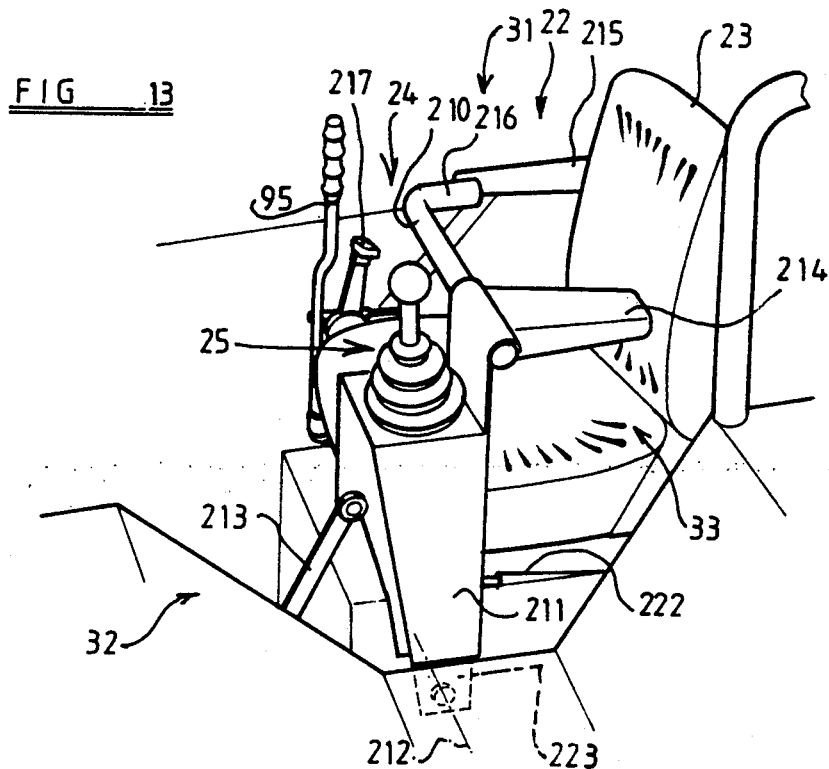
FIG. 13 is a fragmentary perspective view showing part of the operator's compartment of the vehicle of FIG. 1.
Figure 14:
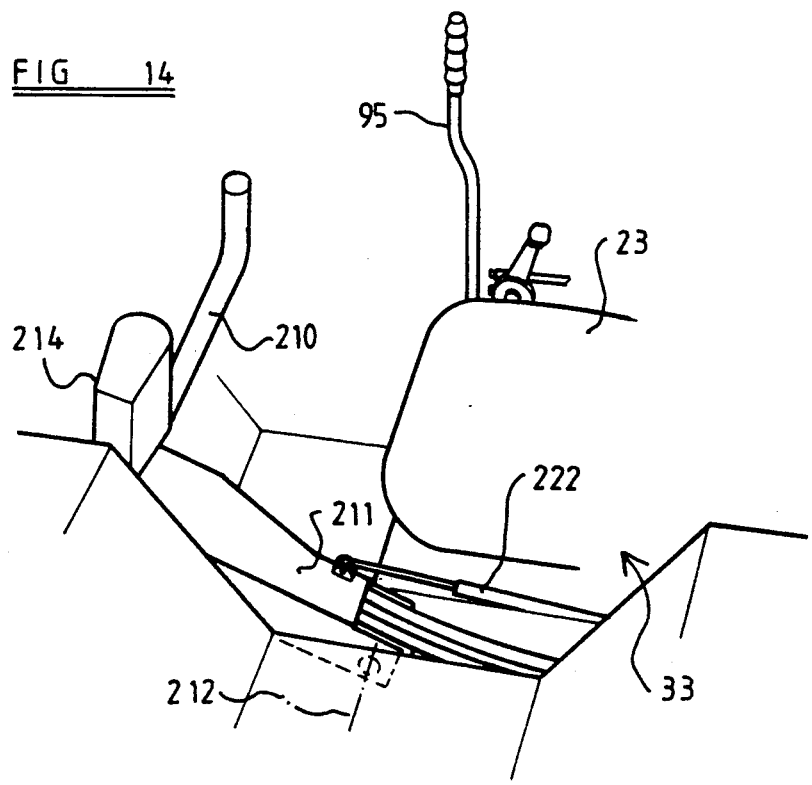
FIG. 14 is another perspective view of part of the operator's compartment shown in FIG. 13 but taken from a different viewpoint.
Figure 15:
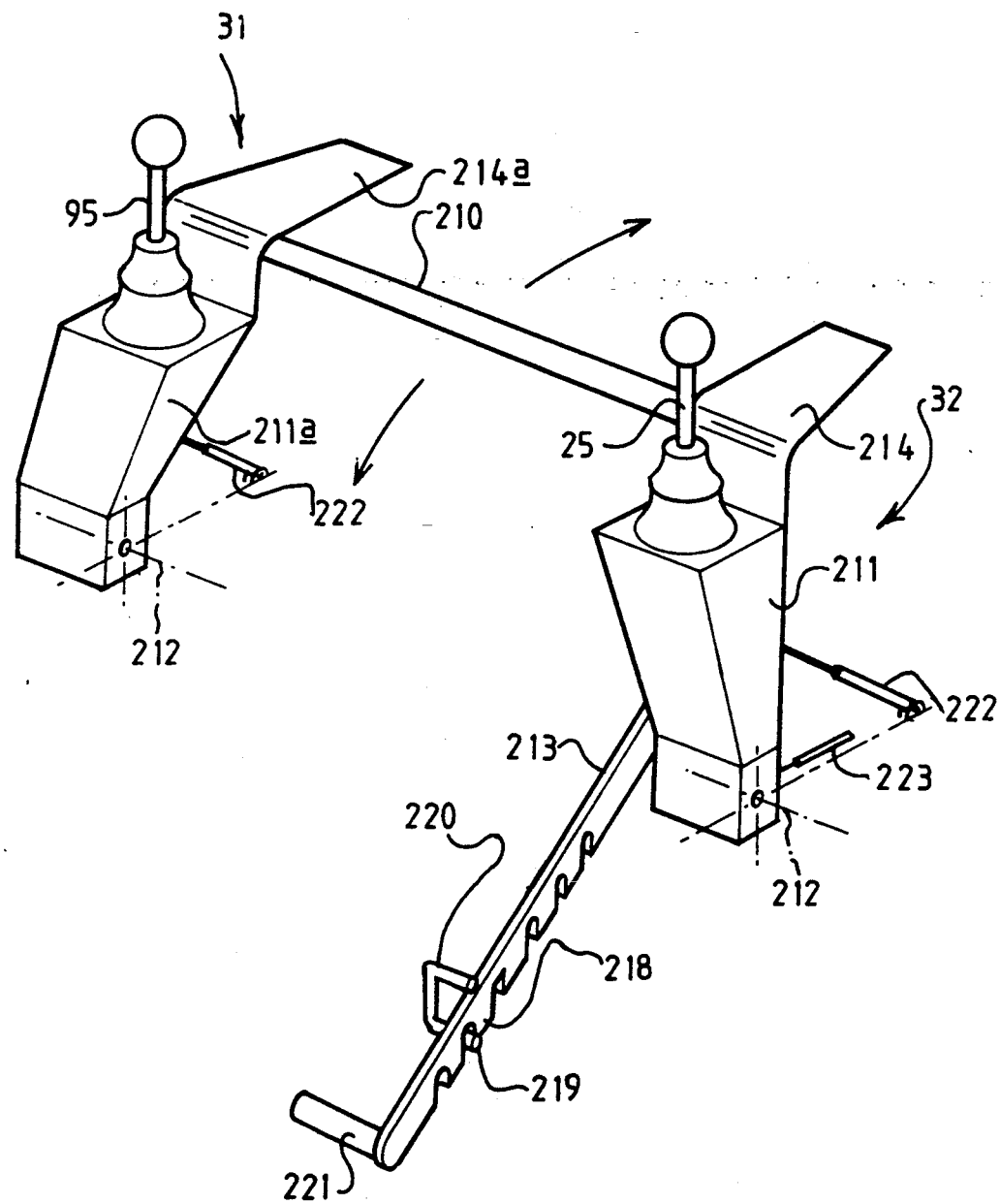
FIG. 15 is a diagrammatic perspective view showing an alternative, and preferred operator restraint to that shown in FIGS. 13 and 14.

Referring now to FIGS. 13-15, a restraint member 210 is provided which is mounted on the body by a lever 211 for movement between operative and inoperative positions. The operative position is shown in FIG. 13 and in this position the member extends transversely of the operator's compartment 22 in restraining relationship with the seat 23 so as to restrain an operator seated on the seat accidentally falling forwards should, for example, the vehicle come to a sudden halt or tip forwardly. The inoperative position is shown in FIG. 14 in which the lever 211 has moved from the generally upwardly position it occupies when the restraint member 210 is in its operative position to a generally forwardly extending position so that the restraint 210 and lever 211 are disposed so as to permit of passage of an operator into and out of the seat 23 through the access opening 33.

The lever 211 is pivoted to the body 11 by suitable pivot means, about an axis 212 which extends transversely of the vehicle. A rigid strut 213 is pivotally connected to the lever 211 at one end and is provided with a ratchet which may engage a ratchet member to lock the lever 211 in its operative position, as hereinafter to be described in more detail with reference to FIG. 15.

In the embodiment illustrated in FIGS. 13 and 14 restraint member 210 extends in cantilever from the lever 211. The lever 211 also carries an arm rest element 214 which pivots with the lever 211 and restraint 210. On the opposite side of the operator's compartment hereinbefore referred to as the "one" side 31 a fixed arm rest element 215 is provided which is fixed relative to the seat 23 and the restraint 210 has a rearwardly directed part 216 which co-operates with the fixed arm rest element 215 so as to fully restrain the operator.

In the embodiment shown in FIGS. 13 and 14 the propulsion control member 95 of the hereinbefore described mechanical rigid linkage is provided and hence is mounted on a fixed part of the body 11 and so, as shown in FIG. 14, does not move with the lever 211 but as it is disposed on said one side 31 of the body it does not interfere with access of an operator through the access opening 33 on said other side 32 of the body.

Also provided on said one side of the compartment mounted on a fixed part of the body is a speed control 217 for the engine.

The lever 211 carries the manually operable loader control 25 which operates the valve means as described hereinbefore, the valve means being connected to the lift and implement operating rams by flexible hydraulic pipes which pass down the lever 211 and exit therefrom adjacent its lower end and pass to their associated rams. The flexible pipes, of course, permit of the hereinbefore described pivotal movement of the lever 211.

Referring now to FIG. 15 which shows a modification of the restraint shown in FIGS. 13 and 14. In this modification the restraint 210 is supported not only by a lever corresponding with the lever 211 described hereinbefore but, in addition, at the opposite end thereof by a second similar lever 211a which is pivotally mounted about the same axis 212 as the lever 211 and which carries a further arm rest element 214a. As shown in FIG. 15 the rigid strut 213 is provided with ratchet teeth 218 which co-operate with a ratchet member 219 which is provided with a co-operating guide 220 to constrain the link 213 from excessive pivotal movement away from the ratchet 219. In addition the link 213 has a transversely extending lug 221 at its lower end which can be engaged by a foot of the operator to enable him to pivot the link 213 upwardly out of engagement with the ratchet 219 to permit of movement of the restraint from an operative to an inoperative position. Alternatively a ratchet mechanism operated by a trigger or other manually operable mechanism on or adjacent the restraint may be provided. Such movement is aided by providing gas springs 222 of conventional type.

The lever 211a carries the propulsion control member 95 of the kind used when the linkage is the hydraulic of flexible mechanical linkage described hereinbefore. In either case the flexible hydraulic pipes or mechanical push-pull cables permit of pivotal movement of the lever 211a about the pivot 212.

If desired, the control means 95 may be mounted on a fixed part of the body irrespective of the linkage and the restraint 210 may be in that case supported by either a single lever as shown in FIGS. 13 and 14 or by two levers as shown in FIG. 15.

The link 213 and gas springs 222 described and illustrated with reference to FIG. 15 also provided in the embodiment shown in FIGS. 13 and 14.

In addition, in both embodiments a flexible cable or rigid mechanical link is provided between the or at least one of the levers 211 and a parking brake of the vehicle. Such a link is shown at 223 in FIGS. 13 and 15.

Although in the illustrated examples the propulsion control lever 95 has been described as being on said one side 31 of the operator's compartment whilst the loader control means 25 has been disposed on said other side 32, if desired the location of the said controls can be transposed consistent with the linkage from the propulsion control being capable of accommodating pivotal movement of the lever 211.

In use, the link 223 ensures that the vehicle parking brake is off when the restraint 210 is in its operative position and is applied when the restraint 210 is in its inoperative position. In addition an interlock to the engine is provided, not shown, which with the restraint 210 in its operative position enables the engine to be continued to run and also enables the engine to be started but, in each case, only if an operator is sitting on the seat since an additional interlock is provided sensitive to the presence or absence of an operator.

When the restraint 210 is moved to an intermediate position from its operative position the interlock senses this and causes the engine to be immobilised.

When the restraint 210 is in its inoperative position the interlock permits the engine to be started and in this case the engine can be started even if an operator is not in the seat but only if the parking brake is applied by virtue of the link 223.

The ratchet teeth 218 are positioned and provided so as to permit of adjustment of the restraint 210 when in an operative range of positions to suit different sizes of driver.

Operator's Compartment

The operator's compartment 22 is defined in part by the inner plates 26a, 27a of the upstanding members 26, 27, the roof 28 and the posts 29 which together provide the enclosure with one side, 31 and a top and rear wall which include means for preventing access therethrough. In the case of the one side 31 this is by virtue of the presence of the boom assembly and also the wire mesh protective screen 30. At the rear, the operator's compartment is defined in part by the front wall 34b of the engine compartment 34. The space between the top wall 34b and the underside of the pivot member 42 whilst preventing access to the operator's compartment does permit the operator to look out of the compartment to the rear beneath the pivot member 42.

The inner plates 26a, 27a which in substance define part of the operator's compartment are themselves integral continuations of the outer walls 161 of the hereinbefore described side members 18, 19. In the present example the inner plates 26a, 27a, and a contoured base 28a are made by bending a single plate to the profile shown in FIG. 4. The roof 28 is welded to the plates 26a, 27a. If desired the operator's compartment may be integrated with other structural members of the body by welding instead of being formed from a single plate.

This it will be seen that the main structural parts of the operator's compartment which provide the wall thereof are formed integrally with other structural elements of the vehicle and in particular the side members 18, 19 which provide the loop cases and the upstanding members 26, 27 which carry the boom assembly pivots and thus the operator's compartment is integrated with the remainder of the machine and hence has a high ability to withstand forces exerted thereon during rollover conditions.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A skid steer vehicle comprising a body having a front end and a rear end and ground engageable propulsion wheels disposed on opposite sides of the body, a stub axle for each propulsion wheel, each stub axle having an outer end on which a said propulsion wheel is carried, a stub axle housing member for each stub axle, means to house a stub axle in each stub axle housing member for rotation of the stub axle relative to the housing member about an axis of rotation, a carrier member provided for each stub axle housing member, the carrier member and the body being provided with co-operating guide means to guide the carrier member for rotation about a reference axis, means to mount each carrier member on the body in a selected one of a plurality of any angular positions about said reference axis, the stub axle housing member being positioned relative to the carrier member so that said axis of rotation is disposed eccentrically relative to said reference axis.

2. A vehicle according to claim 1 wherein each stub axle has an inner end and a flexible loop is drivingly engaged with said driven wheel and with a driving wheel drive by a motor.

3. A vehicle according to claim 1 wherein clamping means are provided to clamp the carrier member in said selected position relative to the body.

4. A vehicle according to claim 1 wherein the body is provided with an engine, two pairs of ground engageable propulsion wheels disposed on opposite sides of the body, a hydraulic drive means including first and second variable displacement pumps driven by the engine and operatively connected to first and second hydraulic motors disposed on opposite sides of the body, each motor being drivably connected to two ground engageable propulsion wheels of an associated one of said pairs of wheels on the associated side of the body by first and second endless loops each of which is engaged with a driving wheel driven by the motor and with a driven wheel connected to an associated one of the ground engageable wheels of said pair and propulsion control means whereby the hydraulic drive means can drive the pair of wheels on one side of the vehicle at a different speed and direction from the pair of wheels on the other side of the vehicle to propel and steer the vehicle.

5. A vehicle according to claim 1 wherein the body is provided with a longitudinally extending loop case compartment on each side of the vehicle, each loop case compartment having a transversely inner wall and a transversely outer wall joined by top and bottom walls and end walls, said stub axle housing member or members being mounted on the outer wall with said driven wheels disposed within said compartment.

6. A vehicle according to claim 5 wherein two stub axle housing members are provided on each side of the vehicle and each of said housing members are mounted on said outer wall with said driven wheels disposed within the compartment with said driving wheels disposed within the compartment therebetween with said loops engaged with respective driving and driven wheels.

7. A vehicle according to claim 5 wherein the outer wall is provided with a circular opening for each housing member to provide one of said co-operating guide means.

8. A vehicle according to claim 2 wherein each driving wheel is carried on an output shaft of a motor and is unsupported by means independent of the motor.

9. A vehicle according to claim 8 wherein the body is provided with a longitudinally extending loop case compartment on each side of the vehicle, each loop case compartment having a transversely inner wall and a transversely outer wall joined by top and bottom walls and end walls, said stub axle housing member or members being mounted on the outer wall with said driven wheels disposed within said compartment and each motor is mounted on one of said inner and outer walls of an associated loop case compartment with each driving wheel disposed within the associated loop case compartment.

10. A vehicle according to claim 9 wherein each driving wheel is carried on an output shaft of the associated motor and is unsupported by a wall of the associated compartment opposite to the wall on which the motor is mounted.

11. A vehicle according to claim 10 wherein the output shaft of each motor is supported at an outer part thereof by an outer bearing carried by a bracket fastened to the respective motor body.

12. A vehicle according to claim 11 wherein the bracket is provided with openings to permit passage of said loop.

13. A vehicle according to claim 12 wherein each driving wheel is provided on a sleeve member which receives the output shaft of the associated motor therein at one end, an inner bearing being provided between the sleeve and the body of the motor.

14. A vehicle according to claim 13 wherein the outer bearing is provided between the bracket and said sleeve.

15. A vehicle according to claim 13 wherein a brake member is carried by the output shaft outwardly of said sleeve.

16. A vehicle according to claim 9 wherein the outer wall of each loop case compartment is provided with an opening adjacent the motor and driving wheel to permit manipulation of a loop into driving relationship with a driving wheel and driven wheel.

17. A vehicle according to claim 15 wherein the brake member is disposed outwardly of the part of the outer wall of the loop case compartment at locations spaced from said motor.

* * * * *